United States Patent [19]

Joyce et al.

[11] Patent Number: 5,123,097
[45] Date of Patent: Jun. 16, 1992

[54] APPARATUS AND METHOD FOR SIMULTANEOUS EXECUTION OF A WRITE INSTRUCTION AND A SUCCEEDING READ INSTRUCTION IN A DATA PROCESSING SYSTEM WITH A STORE THROUGH CACHE STRATEGY

[75] Inventors: Thomas F. Joyce, Westford; Ming T. Miu, Chelmsford, both of Mass.; Richard P. Kelly, Nashua, N.H.

[73] Assignee: Bull HN Information Systems Inc., Billerica, Mass.

[21] Appl. No.: 294,529

[22] Filed: Jan. 5, 1989

[51] Int. Cl.⁵ .......................... G06F 9/00; G06F 9/38; G06F 9/34
[52] U.S. Cl. .......................... 395/375; 364/DIG. 1; 364/DIG. 2; 364/231.8; 364/243.4; 364/247; 364/262.4; 364/933; 364/946.2; 364/964.2
[58] Field of Search ... 364/200 MS File, 900 MS File

[56] References Cited

U.S. PATENT DOCUMENTS

| | | | |
|---|---|---|---|
| 4,345,309 | 8/1982 | Arulpragasam et al. | 364/200 |
| 4,349,871 | 9/1982 | Lary | 364/200 |
| 4,481,573 | 11/1984 | Fukunaga et al. | 364/200 |
| 4,521,851 | 6/1985 | Trubisky et al. | 364/200 |
| 4,541,045 | 9/1985 | Kromer, III | 364/200 |
| 4,682,281 | 7/1987 | Woffinden et al. | 364/200 |
| 4,761,733 | 8/1988 | McCrocklin et al. | 364/200 |
| 4,802,085 | 1/1989 | Levy et al. | 364/200 |
| 4,811,215 | 3/1989 | Smith | 364/200 |
| 4,891,753 | 1/1990 | Budde et al. | 364/200 |
| 4,912,626 | 3/1990 | Fiacconi | 364/200 |
| 4,933,835 | 6/1990 | Sachs et al. | 364/200 |

Primary Examiner—Thomas C. Lee
Assistant Examiner—Mehmet Geckil
Attorney, Agent, or Firm—Faith F. Driscoll; John S. Solakian; William W. Holloway

[57] ABSTRACT

In a data processing system in which each of the data processing units is implemented using pipeline techniques and has a cache memory unit employing a store through strategy, the time required to prepare a write instruction operand address can be substantially shorter than the time required by the execution unit to prepare the associated write instruction operand. In order to utilize the time difference, apparatus is included in the execution cache unit for storing the write instruction operand address during the preparation of the associated write instruction operand. After storing the write instruction operand address, a next address is entered in an input register of the execution cache unit. When the newly entered address is associated with a read instruction, does not conflict with the write instruction operand address, and produces a "hit" signal when applied to the execution cache unit tag directory, the read instruction is processed by the execution unit. When a second write instruction operand address is entered in the input register, the read instruction operand address conflicts with the stored write instruction operand address or the read instruction operand address results in a "miss" when applied to the execution cache tag directory unit, the address is stored in the input register until the write instruction operand has been determined and the associated write instruction has been processed by the execution cache unit.

17 Claims, 6 Drawing Sheets

APPARATUS AND METHOD FOR SIMULTANEOUS EXECUTION OF A WRITE INSTRUCTION AND A SUCCEEDING READ INSTRUCTION IN A DATA PROCESSING SYSTEM WITH A STORE THROUGH CACHE STRATEGY

BACKGROUND OF THE INVENTION

1. Field of the Invention

This invention relates generally to data processing systems and, more particularly, to data processing systems that are implemented using pipeline techniques and a store through (write through) cache strategy Apparatus and method for processing instructions in a period between the time of completion of a write instruction operand address and the time of completion of the write instruction operand are described.

2. Description of the Related Art

The pipeline technique is widely used to increase the performance of data processing units. In this technique the data processing unit is partitioned into various segments, each segment processing a portion of an instruction for a selected period of time. Using this technique, the execution of an individual instruction will typically require a longer time in a pipelined system than execution of an instruction in a non-pipelined data processing unit. However, an instruction can be completed during each selected period of time in the pipelined data processing system, thereby increasing the rate of instruction execution in a pipelined data processing unit.

The increased instruction execution rate is achieved by maintaining an orderly sequence of instruction execution. However, operand processing operations, typically performed in an execution unit of a data processing unit, can take varying amounts of time. The pipelining technique can accommodate this processing time variability by providing a sufficiently long selected period of time to permit any possible operation by the execution to be completed in the selected period of time. This solution adversely impacts the performance of the data processing system. A second solution to execution unit processing time variability is to provide a relatively short execution unit selected period of time and suspend processing of other instruction segments for operations in the execution unit requiring longer periods of time. This approach, relatively easy to implement in a pipelined data processing unit, results in portions of the data processing unit being idle for substantial periods of time. Finally, the problem of processing time variability by the execution unit can be addressed by parallel (execution) processing units along with control apparatus to reassemble the resulting operands in correct sequence This approach requires substantial additional apparatus in the data processing unit and a substantial increase in control functionality to prevent compromise of the processing operations.

The operations involving increased execution time by the execution unit can impact the performance of the data processing unit in the following manner. The processing of a write instruction can result in the associated operand address, even when processed in a virtual memory environment (i.e., the data processing unit associates a virtual address with an operand while the execution cache unit and the main memory unit typically associates a real address with an operand, the translation of addresses taking place in a virtual memory management unit) that is completed at an earlier time than the completion of the associated operand itself In the store through (write through) cache strategy of the preferred environment of the present invention, the real address is required for storage in the main memory unit. During the associated delay, processing of instructions involving the execution unit is suspended pending completion of the operand.

A need has therefore been felt for apparatus and a related technique to permit a cache unit associated with an execution unit of a pipelined data processing unit to continue processing operations in the interval between the availability of an operand address associated with a write instruction and the availability of the operand associated with the write instruction.

FEATURES OF THE INVENTION

It is an object of the present invention to provide an improved data processing system.

It is a feature of the present invention to provide an improved data processing system having at least one pipelined data processing unit and a memory unit included therewith.

It is another feature of the present invention to provide an increased instruction execution rate for pipelined data processing units using a store through strategy for the execution unit cache memory units.

It is still another feature of the present invention to provide an execution cache unit that can process instructions between the time when an operand address associated with a write operation is available and the time that the operand associated with the write operation is available.

It is a more particular feature of the present invention to process read instructions in an execution cache unit prior to completion of a pending write instruction by the execution cache unit when the read instructions do not impact the write instruction.

SUMMARY OF THE INVENTION

The aforementioned and other features are accomplished, according to the present invention, by including in the execution cache or E-cache unit apparatus for storing a write instruction operand address while the execution unit is preparing the write instruction operand. When storing the write instruction operand address, a "hit" signal is stored therewith when the location addressed by the write instruction address in the tag directory unit has "valid" operand stored therewith. Apparatus is included in the E-cache unit to determine when an address newly applied to the E-cache unit conflicts with the stored write instruction operand address. When an address newly applied to the E-cache unit is associated with a read instruction, does not conflict with the stored write instruction operand address, and results in a "hit" signal when applied to the E-cache unit tag directory unit, the associated read instruction is processed by the E-cache unit. When these conditions are not true, the address is stored in an E-cache unit input register until the write instruction operand has been forwarded, along with the stored write instruction operand address, to the memory unit and stored in the E-cache storage unit when the "hit" signal is stored with the write instruction operand address.

These and other features of the invention will be understood upon reading of the following description along with the drawings.

DESCRIPTION OF THE PREFERRED EMBODIMENT

Detailed Description of the Figures

The present invention is adapted to function in a data processing system in which certain types of instructions are executed by an earlier unit and dropped out of the production line while other types of instructions are executed at the end of the production line. The address unit of the data processing unit includes means for executing the instruction if it is a "non-memory" instruction. The "non-memory" instruction, by having been executed in the address unit, is effectively dropped or removed from the production line and therefore requires no further cycles in the production line thereby improving the system throughput.

Figure 1:
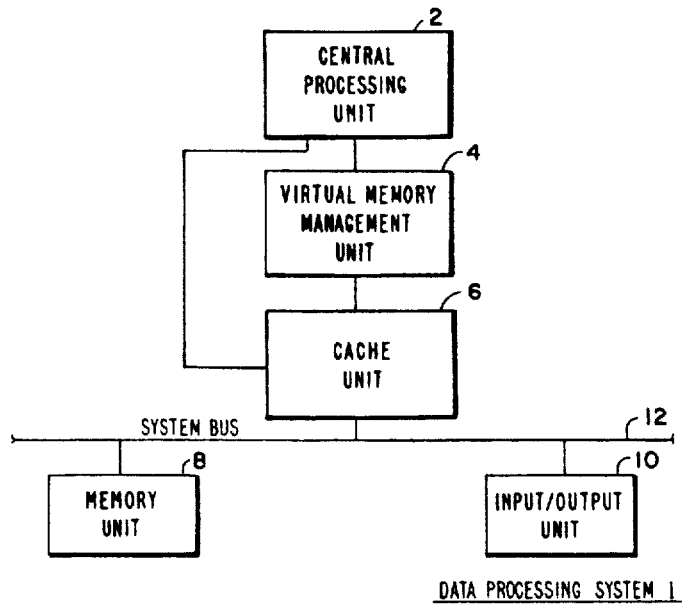
FIG. 1 is a block diagram of the overall system which includes the apparatus of the present invention.

FIG. 1 shows a block diagram of a cycle production pipeline data processing system 1 Included are a central processing unit (CPU) 2, a virtual memory management unit (VMMU) 4, a cache unit 6, a memory unit (or subsystem) 8, and input/output (peripheral) unit 10. The cache unit 6, memory unit 8, and input/output peripheral unit 10 are all coupled in common to a system bus 12. The memory unit 8 stores instructions and operands. Those operands and instructions, having the highest probability of being executed immediately, are transferred to cache unit 6 from the memory subsystem 8.

The CPU 2 receives instructions from the cache unit 6 and in the execution of these instructions sends the virtual address portion of the instruction to VMMU 4. The VMMU 4 translates the virtual address into a physical address which is applied to cache unit 6 for fetching the necessary operands to allow the CPU 2 to execute the instructions.

The input/output unit 10 represents typically any number of peripheral controllers with their devices, an input/output processor which controls peripheral controllers and devices, or a communications subsystem.

Figure 2:
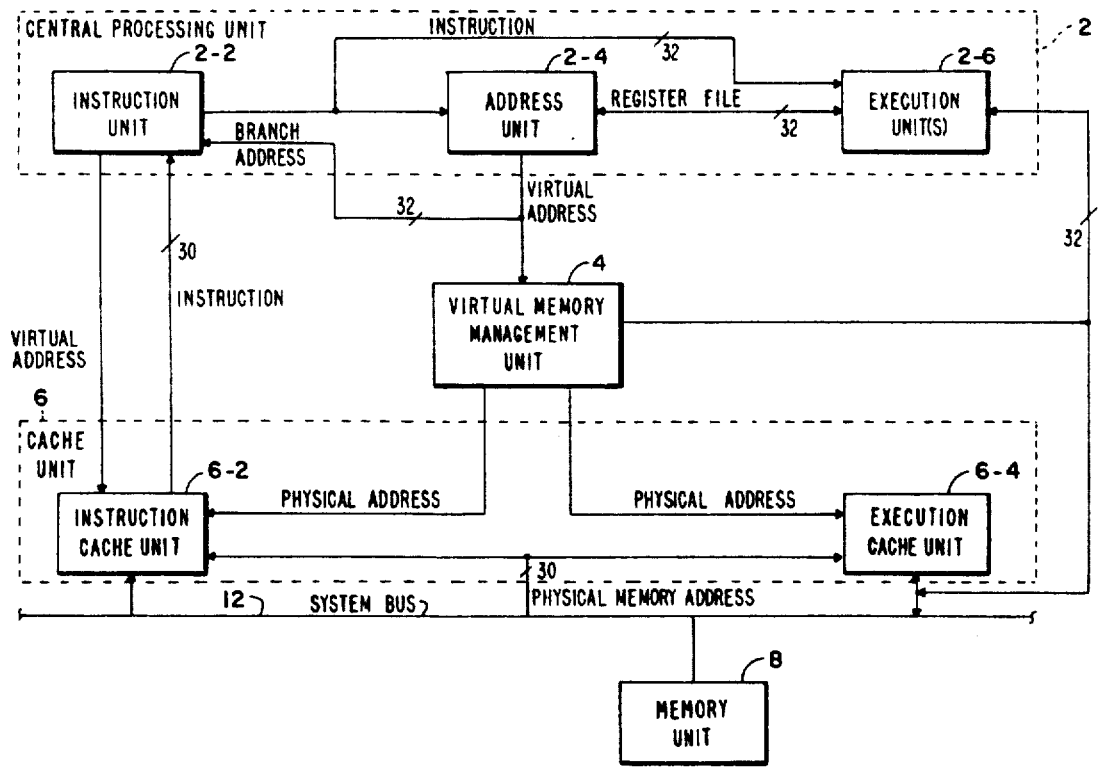
FIG. 2 is a more detailed block diagram of the overall system of FIG. 1.

FIG. 2 shows in block diagram form the major elements that make up the CPU 2 and the cache unit 6. The CPU 2 includes an instruction (or I) unit 2-2, an address (or A) unit 2-4, and a number of execution (E) units 2-6. The execution units 2-6 could be a scientific instruction processor or a commercial instruction processor. However, for simplicity of description, only the operation of one of the execution units 2-6 is described which is sufficient to understand the invention.

The cache unit 6 includes a cache unit associated with the I unit 2-2 referred to as the instruction cache unit or I-cached unit 6-2 and a cached unit associated with the E unit 2-6 referred to as the execution cache unit or the E-cache unit 6-4. The I-cache unit 6-2 stores the instructions that are to be executed and the E-cache unit 6-4 stores the operands upon which the instructions operate. The I-unit 2-2 performs essentially two functions. It prefetches instructions from I-cache unit 6-2 and then cracks or interprets those instructions to determine how the other units, namely the address (or A) unit 2-4 and the E unit 2-6, will further process the instruction.

The A unit 2-4 receives the instruction from the I-unit 2-2 and executes the instruction if it is a register-to-register instruction or a branch instruction. When the instruction is to be executed by the E unit 2-6, the A unit 2-4 sends a virtual address to the VMMU 4 which translates it into a physical address for the E-cache unit 6-4. E-cache unit 6-4 sends the operands to the E unit 2-6 for the completion of the execution of the instruction originally received by the instruction unit 2-2 from the I-cache unit 6-2.

The A unit 2-4 will also complete the execution of a branch instruction and send the branch address back to the instruction unit 2-2 so that it may request the next instruction at the location in I-cache unit 6-2 specified by the branch address. Both the A unit 2-4 and the E unit 2-6 include register files which store the contents of the registers which are accessible to the programmers, that is, so called software visible registers. Both the I-cache unit 6-2 and the E-cache unit, 6-4 are coupled to system bus 12 and their contents are updated with instructions and operands received from memory unit 8.

Instructions are executed in a production pipeline fashion by the elements of CPU 2. That is, the I unit 2-2 receives an instruction from I-cache unit, 6-2. cracks it, and then sends the instruction to the A unit 2-4. The A unit 2-4 either executes the instruction or sends the virtual address to the VMMU 4 for translation in order to address the E-cache unit 6-4. E-cache unit 6-4 sends the designated operands to the E unit 2-6.

While the A unit 2-4 is executing its portion of the first instruction from the I unit 2-2, the I unit 2-2 is fetching the second instruction and subsequent instructions from I-cache unit 6-2. When the A unit 2-4 sends the virtual address specified by the first instruction to the VMMU 4 and notifies the I unit 2-2 of that event, the I unit 2-2 sends the second instruction to the A unit 2-4. The VMMU 4 addresses the E-cache unit 6-4 while the A unit 2-4 is processing the second instruction in the pipeline. When the E unit 2-6 is executing the first instruction, the VMMU 4 may be addressing E-cache unit to fetch the operands of the second instruction while the A unit 2-4 is generating a virtual address of the third instruction. Meanwhile, the I unit 2-2 is cracking the fourth instruction and fetching one of the subsequent instructions. Therefore, in this typical example, there could be five instructions progressing down the production line.

However, since the A unit 2-4 can execute certain software visible register instructions, they are removed from the production line as soon as the execution of those instructions is completed by the A unit. Similarly, when the A unit 2-4 is processing a branch instruction and the conditions of the branch are met, the A unit 2-4 immediately sends the branch address to the I unit 2-2 and that branch instruction will be removed from the production line. This mode and method of operation results in increased throughput as compared to the prior art.

Figure 3:
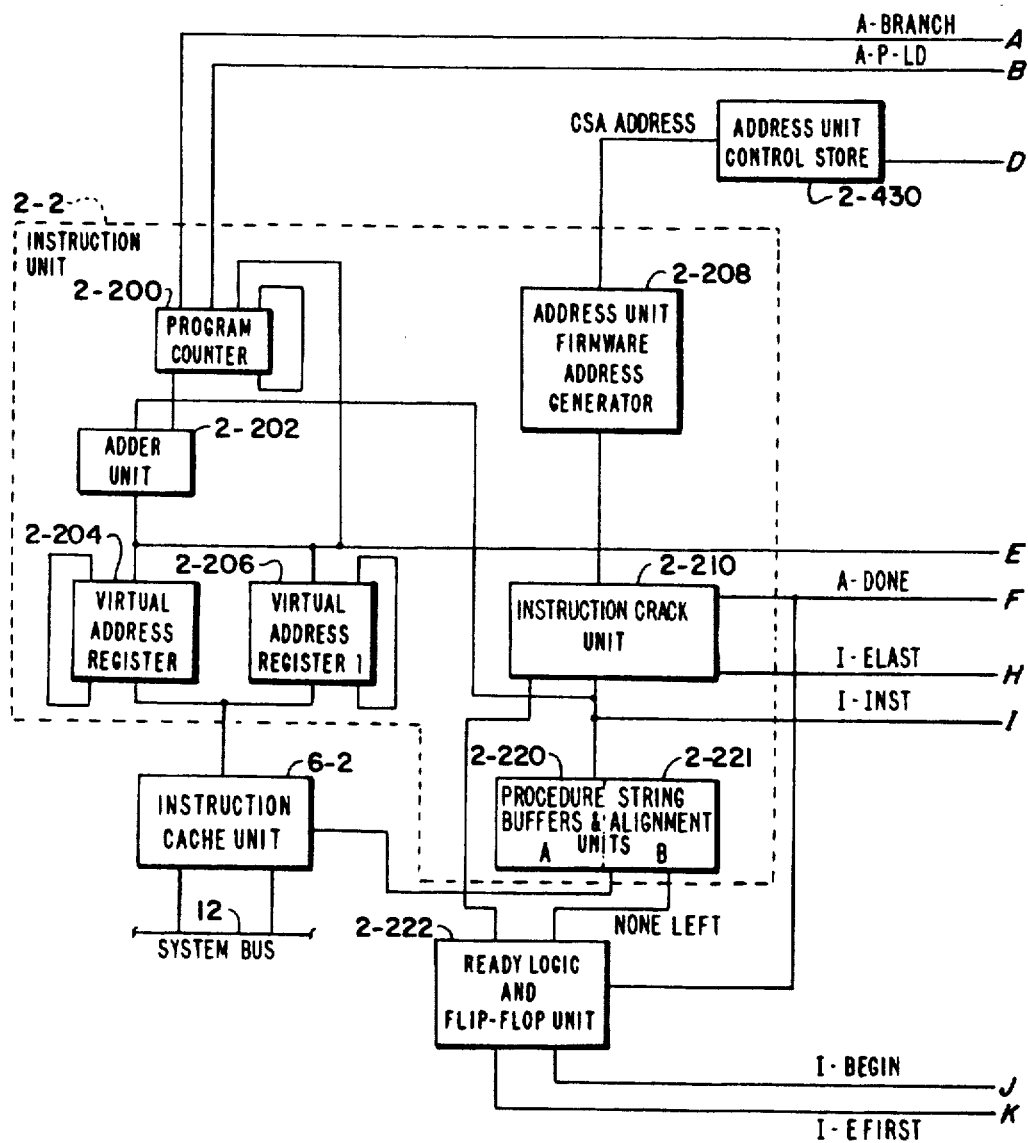
FIG. 3 is a logic block diagram of major elements of the production pipeline cycles.
Figure 3:
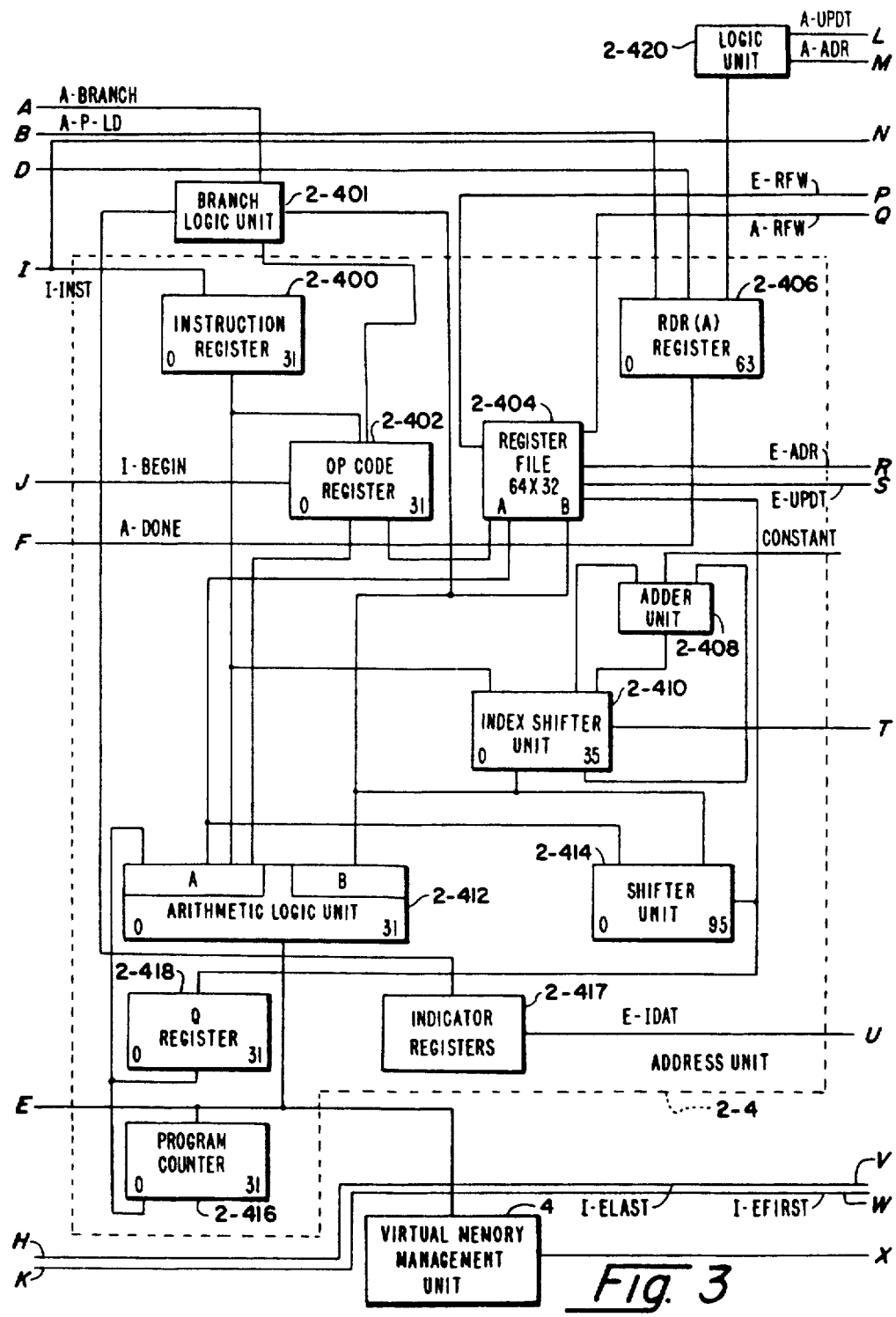
Figure 3:
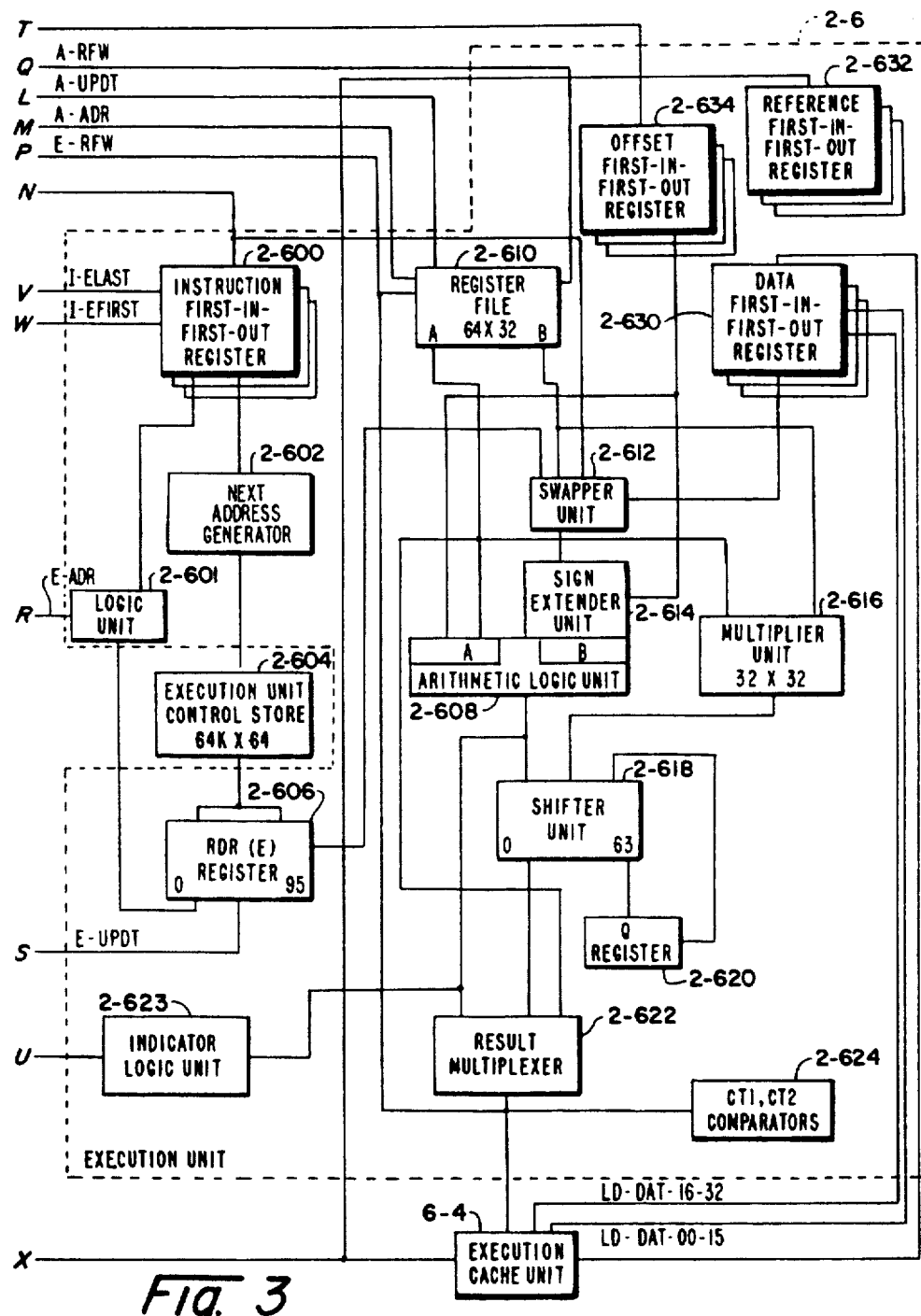

FIG. 3 shows in greater detail the elements of the instruction unit 2-2, the A unit 2-4, the execution unit 26 and their respective interconnections. The program counter or P-counter 200 of the instruction unit 2-2 is loaded by the A unit 2-4 with a virtual address. This virtual address is the address in I-cache unit 6-2 of the location of the next instruction that is to be placed into the pipeline. During the instruction fetch or I-FETCH cycle, the virtual address is transferred to I-cache unit 6-2 via an adder unit 2-202 and either a virtual address register 0 or VA0 2-204 or a virtual address register 1 or VA1 2-206. Either register VA0 2-204 or register VA1 2-206 is used until a branch instruction is fetched. Then, if register VA0 2-204 is active, the address called for by the branch instruction would be stored in register VA1 2-206.

The reason the branch address is held separately in the VA0 2-204 and VA1 2-206 registers is because if it is a conditional branch, the condition may or may not be met. If the condition is not met, then no branch will result. This gives the system the choice of either using or not using the address called for by the branch. The P counter 2-200, under firmware control, is incremented by one for one word instruction, incremented by two for a double word instruction, or replaced by a branch address.

The instruction is read out of I-cache unit 6-2 into either procedure string buffers and alignment unit A 2-220 or procedure string buffers and alignment unit B 2-221. Here again, one set of procedure string buffers and alignment units receives successive instructions from I-cache unit 6-2 until there is a branch instruction. Then the instruction following the branch instruction is stored in buffers in the other procedure string buffers and alignment unit. For example, if the procedure string buffers and alignment unit A 2-220 is being used, then the instruction following the branch instructions would be stored in the procedure string buffers and alignment unit B 2-221. The throughput is improved by storing both sets of instructions in case the branch conditions are met and the A unit 2-4 fetches the branch string from procedure string buffers and alignment unit B 2-221.

The instruction is then sent to the instruction crack unit 2-210 which determines the kind of instruction it is. That is, if this is a software visible register to register instruction, then it will be executed by the A unit 2-4 if it is a memory instruction that will be executed by the E unit 2-6.

The instruction is sent from the instruction crack unit 2-210 to an address unit firmware address generator 2-208 which addresses an address unit control store 2-430. The contents of the addressed location is stored in an RDR(A) register 2-406 in the A unit 2-4. The instruction signals I INSTR 0-31 from the procedure string buffers and alignment units 2-220 or 2-221 are transferred to the instruction (RINSTR) register 2-400 in the A unit 2-4. If the instruction is to be executed by the E unit 2-6 it is also stored in an instruction first-in-first-out (FIFO) register 2-600 in the E unit 2-6. The instruction is also stored in an OP-CODE register 2-402 in the A unit 2-4 under control of a signal I-BEGIN from the 1 unit 2-4. Both the RINSTR register 2-400 and the OP CODE register 2-402 store double words of 32 bits each. If an instruction requires 2 or 3 double words, then the OP CODE for that instruction remains in the OP CODE register 2-402 while each of the double words of the instruction in turn are stored in the instruction or RINSTR register 2-400.

The output of the OP CODE register 2-402 is used primarily for addressing a register file 2-404 under control of OP CODE and firmware bits stored in the OP CODE register 2-402 and the register RDR(A) 2-406 respectively. The register file 2-404 includes the software visible registers. If the instruction being executed is a memory instruction, then a virtual address is generated and sent to the VMMU 4 via an arithmetic logic unit (ALU) 2-412. Depending upon the instruction being executed by the E unit 2-6, the input to the ALU 2-412 may be applied to the A input portion of the ALU 2-312 by one of the RINSTR register 2-400, the OP CODE register 2-402, the register file 2-404 or a program counter 2-416. ALU 2-412 B side inputs are provided by an index shifter unit 2-410 for index or offset operations, via an adder unit 2-408 or from register file 2-404. If this is a register instruction, for example, a shift operation of the contents of a software visible register in the register file 2-404, then the output of the register file 2-404 may be applied to the shifter unit 2-414, be shifted the number of bits specified by the instruction and stored back in the register file 2-404 in the same register from which it was read.

For the conditional branch instruction, signals from RINSTR register 2-400 and from the ALU 2-412 are applied to branch logic unit 2-401. The output, load signal A-P-LD, enables the P-counter 2-200 to accept the branch address signals A-BRANCH which are sent to I-cache unit 6-2.

When the A unit 2-4 has completed the execution of the instruction, an A-DONE signal is sent to the instruction crack 2-210 of the I unit 2-2. This informs the I unit 2-2 to send the next instruction stored in the procedure string buffers and alignment units 2-220 or 2-221 to the A unit 2-4 and if required, to the E unit 2-6. If an instruction calls for execution by the E unit 2-6, then the I unit 2-2 sends that instruction to the instruction FIFO register 2-600 under control of signal I-ELAST and signal I-EFIRST. These signals control the loading of the instruction FIFO register 2-600.

The I-BEGIN signal is received by the A unit 2-4 when the CRACK signal is generated, the system is not in a hold mode and no logic block including the clock logic is in a stall mode.

The CRACK signal is generated when the ready logic and flip flop unit 2-222 is ready, to crack the instruction, the procedure string buffers and alignment unit A 2-220 or procedure string buffers and alignment unit B 2-221 store at least one instruction, and the A unit 2-4 had generated the ADONE signal indicating that the A unit is available for processing the next instruction.

The I unit 2-2 generates the I-EFIRST and the I-ELAST signals by the ready logic and flip flop unit 2-222 if the instruction being cracked is to be executed by the E unit 2-6. Both signals are applied to the instruction FIFO register 2-600. The I-EFIRST signal enables the instruction FIFO register 2-600 to store a double word instruction. The I-ELAST signal enables the instruction FIF0 register 2-600 to store a single word instruction.

Note that the I unit 2-2 sends the instruction to be executed in the A unit 2-4, and only to instruction FIFO register 2-600 if the instruction is to b ⓔexecuted in the E unit 2-6. In the E unit 2-6, the next instruction the instruction FIFO register 2-600 will execute is applied to the next address generator 2-602 which generates the E unit control store 2-604 address location. The firmware word is stored in a register RDR(E) 2-606. The instruction FIFO register 2-600 stores up to four instructions.

When the A unit 2-4 sends its virtual address to the VMMU 4, the VMMU 4 generates the physical address which addresses the E-cache unit 6-4. The contents of the addressed location is stored in a data FIFO register 2-630 in the E unit 2-6 by signal LD-DAT-0015 for a single word transfer or signal LD-DAT 1631 for a double word transfer. Signal LD-DAT-0015 also increments by one the data FIFO register 2-630 write address to accept the second word of the transfer if the first word was not at an E-cache unit 6-4 word boundary. These data are the operands on which the instruction will operate. The E unit 2-6 executes instructions whose operands are stored in software visible registers of register file 2-630. A typical instruction is the multiply instruction.

For this instruction, the A unit 2-4 generates a dummy cycle by sending the virtual address hexadecimal 40 to the VMMU 4. This results in the E-cache unit 6-4 generating a dummy cycle by sending signal LD-DAT 1631 to the FIFO 2-630 with a "dummy" operand.

If in the I unit 2-2, the instruction calls for a branch and has a displacement, then the displacement from the instruction crack unit 2-210 is applied to the adder unit 2-202 to be added to the contents of the P-counter 2-200 and stored in either register VA0 2-204 or register VA1 2-206 and applied to the I-cache unit 6-2.

A multiplier unit 2-616 is coupled to the A & B ports of register file 2-610 to generate and store partial products in conjunction with the shifter unit 2-618 and the Q register 2-620. The partial products are applied to a result multiplexer (MUX) 2-622 and stored in accumulator location in register file 2-610. When the multiplication is completed the final result is stored in one of the software visible registers of register file 2-610.

A swapper unit 2 612 receives operands from the B side of register file 2-610 for swapping words within double words and swapping bytes within single words. A 16-bit word is made up of two 8-bit bytes. A double word is made up of two 16-bit single words or four 8-bit bytes. A sign extender unit 2-614 repeats the sign of all the high order positions of a double word to the left of the first significant bit of the double word.

The CT1 and CT2 counters 2-624 are used in the calculation of the exponent of a floating point resultant. A mantissa of a floating point operand is processed through the ALU 2-608 and a shifter unit 2-618 in a conventional manner.

The software visible registers in both the register files 2-404 with A unit 2-4 and 2-610 in the E unit 2-6 are updated on successive cycles so that they both contain the same information. This is accomplished by firmware signals from register RDR(A) 2-406 which are applied to logic unit 2-420 to generate an update signal A-UPDT which enables the register file 2-610 and six A-ADR signals which ar applied to the address terminals of register file 2-610 to store the data from the D terminal of the register file 2-404 to the D terminal of register file 2-610. Similarly, the E-UPDT signal from register RDR(E) 2-606 enable register file 2-404 to store the data at the address specified by signals E-ADR from logic unit 2-601. Logic unit 2-601 signals E-ADR instruction signals from the instruction FIFO register 2-600 and firmware signals from RDR(E). 2-606.

The A unit 2-4 program counter 2-416 stores the address of the next instruction. Program counter 2-200 in the I unit 2-2 also stores the address of the next instruction. The reason for the two registers is that, in case of a conditional branch, program counter 2-200 in the I unit 2-2 stores the branch address in case it is to be used, whereas the program counter 2-416 will not store the branch address but stores the next address in the sequence presently being executed.

Figure 4:
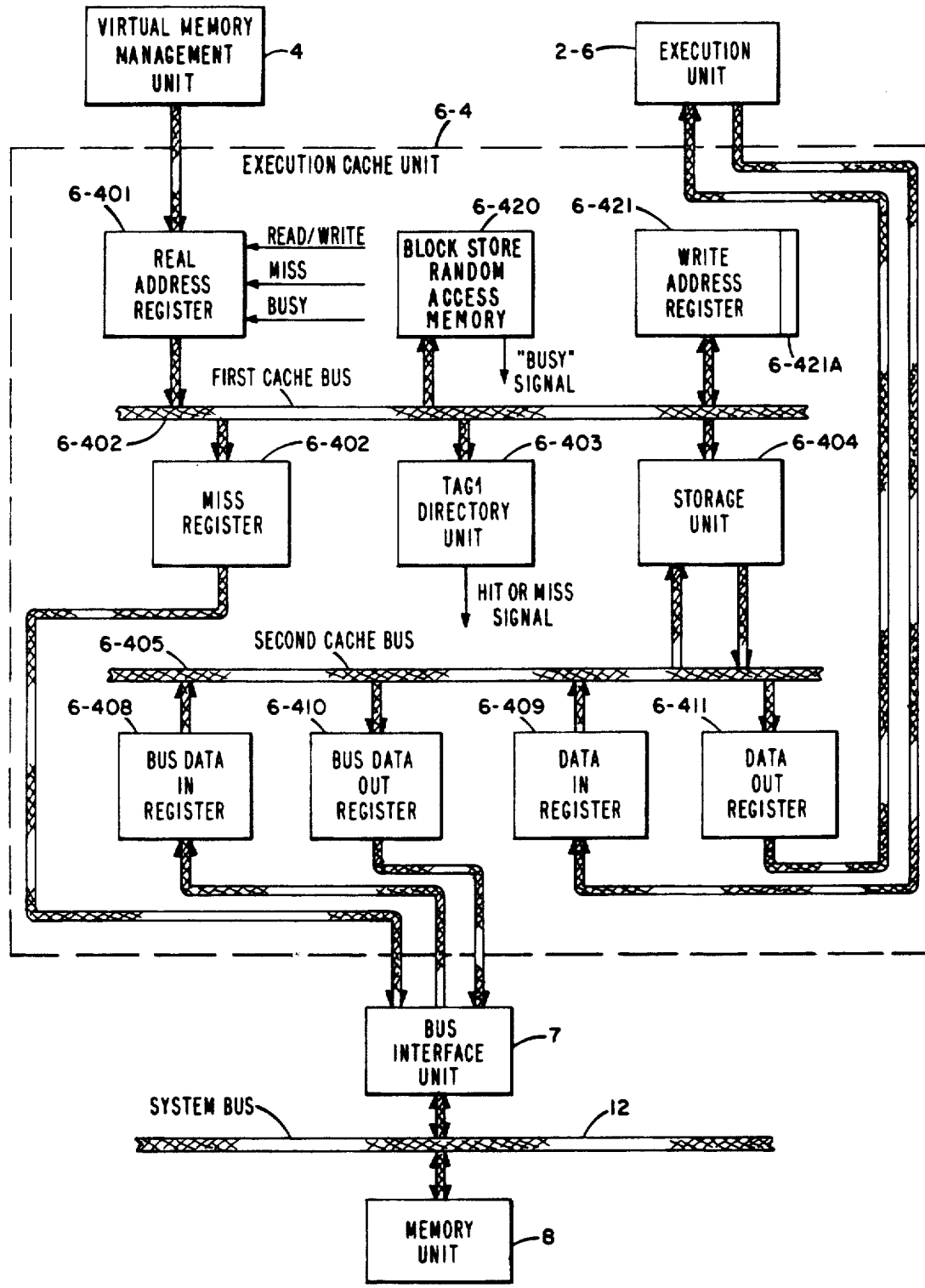
FIG. 4 is a block diagram of a cache memory unit and related data processing system components used in the present invention.

Referring next to FIG. 4, the components of the E-cache unit 6-4, necessary for understanding the present invention, are illustrated. An address associated with an instruction is transferred from the address unit 2-4 to the VMMU 4 wherein the virtual address (from the address unit 2-4) is translated into a real address. The real address is entered into the real address register 6-401. In the prior art, the address of the real address register is applied to the tag directory unit 6-403 and when the tag directory unit 6-403 stores- the applied address along with a "valid" logic bit (indicating that the associated operand is not compromised), then a "hit" signal is generated and, for a read instruction, the operand in the storage unit 6-404 at a location associated with the address in the real address register 6-401 i transferred to the execution unit 2-6 via data out register 6-411. When the address in the real address register 6-401 is not stored in the tag directory unit 6-403 or the address is stored but a "valid" signal is not present therewith, then a "miss" signal is generated. For a read instruction, the address in the real address register is entered in the miss register 6-402, applied to the bus interface unit 7 and applied, along with control signals, to the system bus 12. The required operand is retrieved from the memory unit 8 and transferred via system bus 12, bus interface unit 7 and data in register 6-408 to the storage unit 6-404 where the operand is stored at a location determined by the address in the real address register 6-401. The "valid" signal is stored in an associated location in the tag directory unit 6-403. When the "miss" signal is present and a write instruction is associated with the address in the real address register 6-401, then an operand from the execution unit 2-6 is applied to the system bus through the data in register 6-409, the bus data out register 6-410 and the bus interface unit 7. This write instruction operand is applied to the system bus along with the write operand address from the real address register 6-401 and the write operand is stored in the memory unit 8 at a location determined by the write operand address. When the "hit" signal is present for a write instruction, the operand is also stored in the storage unit 6-404 at a location determined by the address in the real address register 6-401. The automatic storage of a write operand in the memory unit 8 is referred to as write-through or store through cache strategy.

In the present invention, a write address register 6-421 is provided so that additional cache activity can be accomplished while the write instruction operand, associated with a write operand address in the write address register 6-421, can be determined. In addition, when the address in the real address register 6-401 is being transferred to the write address register 6-421, the write operand address is applied to the tag directory unit 6-403. When the application of the write operand address in the real address register 6-401 to the tag directory unit 6-403 produces a "hit" signal, a "hit" signal is stored in a location 6-421A associated with the write operand address.

The E-cache unit 6-4 of the present invention includes a block store random access memory (or ram) 6-420. When the address in the real address register 6-401 is transferred to write address register 6-421, the address is stored in the block store ram 6-420. The block store ram 6-420 has the property that, when the same address is applied to the block store ram as is stored in the block store ram, a "busy" signal is generated. The "hit" signal and the "busy" signal are used as control signals in the present invention to control processing activity in the E-cache unit 6-4.

Figure 5:
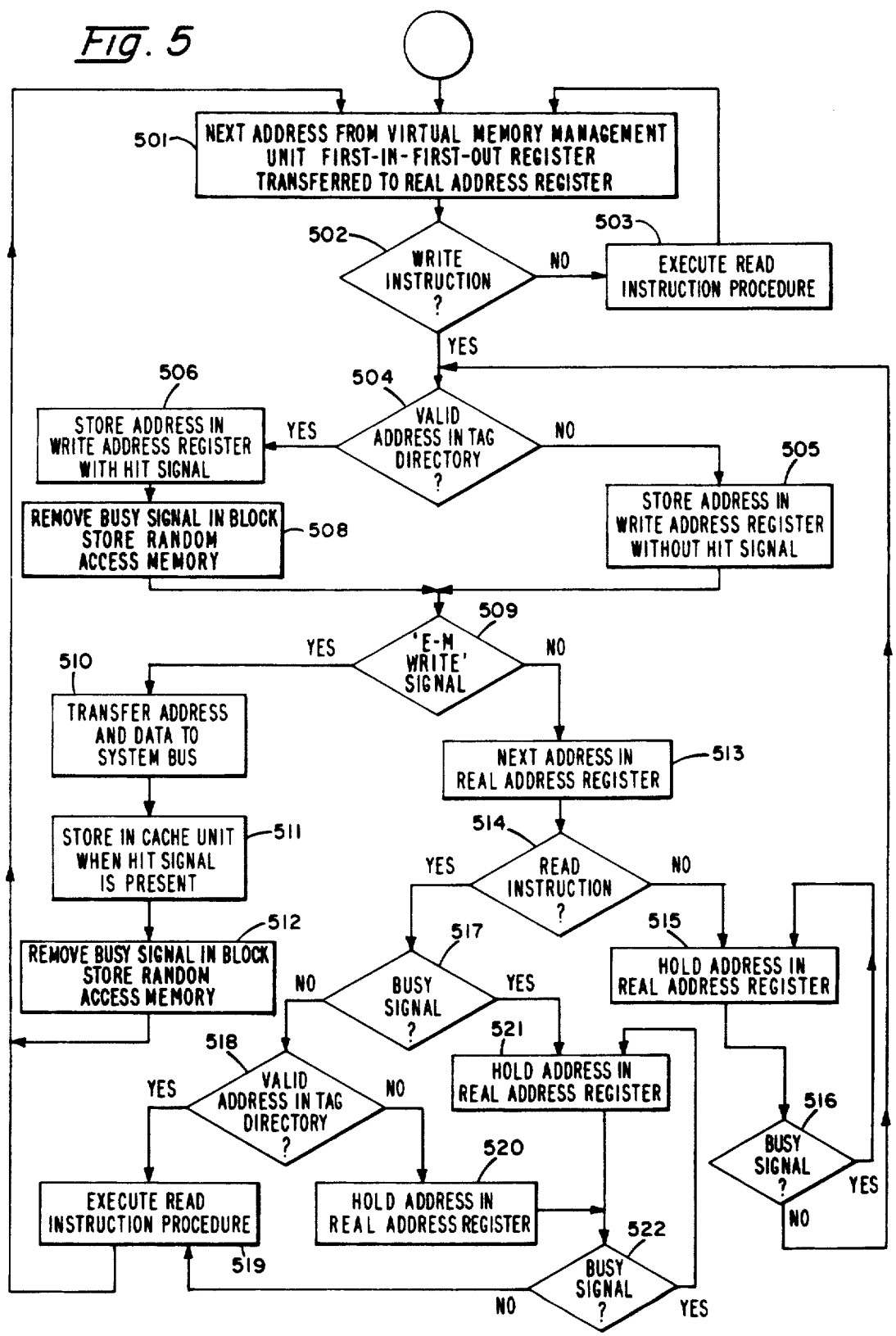
FIG. 5 is flow diagram illustrating the processing of address signals by the execution cache unit according to the present invention.

Referring next to FIG. 5, the operation of the present invention is illustrated by means of a flow diagram. In step 501, a next sequential address from the first-in, first-out (FIFO) register of VMMU 4 is entered into the real address register 6-401 of the execution cache unit 6-4. In step 502, a determination is made whether the address entered in the real address register 6-401 is associated with a read instruction or a write instruction. When the address is associated with a read instruction, the read instruction procedure is executed by the execution cache unit in step 503 and a next address from the VMMU 4 is entered in the real address register 6-401 in step 501. When the address in real address register 6-401 is associated with a write address in step 502, then the contents of the real address register 6-401 are applied to the tag directory unit 6-403 and a determination is made whether the tag directory unit 6-403 has the applied address stored therein along with a "valid" status signal in step 504. When the tag directory unit 6-403 does not store the applied address along with a "valid" status signal, then the contents of the real address register are stored in the write address register without a "valid" signal stored in the location 6-421A. When, in step 504, the applied address and a "valid" status signal are present, then the address in the real address register 6-401 is stored in the write address register 6-421 and a "valid" signal is stored in the write address register location 6-421A in step 507. In step 508, the address from the real address register 6-401 are entered in the block store ram 6-420. In step 509, a determination is made whether the write operand is available, i.e., is the E-MWRITE signal from the execution unit 2-6 present. When the E-MWRITE signal is present, then, in step 510, the address from the write address register 6-421 and the associated operand from the execution unit 2-6 are applied to the bus interface unit 7. In step 511, when the "valid" signal is present in the write address register 6-421, the contents of the write address register 6-421 are applied to the storage unit 6-404 and the associated operand from the execution unit 2-6 is stored at the addressed location in the storage unit 6-404. In step 512, the "busy" signal (and associated address) are removed from the block store ram 6-420 and the next address from the VMMU 4 is stored in the real address register 6-401. When, in step 509, the associated operand is not ready from the execution unit 2-6, then the next address is entered from the VMMU 4 in the real address register 6-401 in step 513. In step 514, a determination is made as to whether the address in the real address register 6-401 is a read instruction or a write instruction. When the address in the real address register 6-401 is associated with a write instruction, then the address is held in the real address register 6-401 until the "busy" signal is removed from the block store ram 6-420 in step 516. When the "busy" signal is removed from the block store ram 6-420, then the contents of real address register 6-401 are applied to the tag directory unit 6-403 to determine if the identical address is stored along with a "valid" signal in step 504. When, in step 514, the address in the real address register 6-401 is associated with a read instruction, then the address in the real address register 6-401 is applied to the block store ram 6-420 and a determination is made in step 517 as to whether the address of the real address 6-401 register reserved by the address stored in the write address register 6-421 as indicated by the presence of a "busy" signal from the block store ram 6-420. When the block store ram 6-420 provides a "busy" signal, then the address in the real instruction register 6-401 is held therein in step 521 until the "busy" signal from the block store ram 6-420 is removed in step 522. When the "busy" signal from the block store ram 6-420 is removed, then the read procedure is executed in step 519 and a next address is entered into the real address register 6-401 in step 501. When, in step 517, the block store ram 6-420 does not provide a "busy" signal, then the address in the real address register 6-401 is applied to the tag directory unit 6-403 to determine if the address stored in the real address register 6-401 is stored along with a "valid" signal in the tag directory unit 6-403 in step 518. When the address in the real address register 6-401 is stored along with a "valid" signal in the tag directory unit 6-403, then the read instruction procedure for the cache memory unit is executed in step 519. When, in step 518, the address stored in the real address register 6-401 and an associated "valid" signal are not stored in the tag directory unit 6-403, then the address in the real address register 6-401 is held therein in step 520 until the "busy" signal is removed in step 522. The read procedure associated with the address stored in the real address register 6-401 is executed in step 519.

2. Operation of the Preferred Embodiment

The present invention provides a technique for using the time between the completion of a write instruction operand address by the VMMU unit and the completion of the preparation of the write instruction operand. The present invention provides for the storing of the write instruction operand address along with an indicia indicating the presence of a valid operand at the location determined by the write instruction operand address. In the present invention, a read instruction can be processed by the E-cache unit when the read instruction operand address does not conflict with the stored write instruction operand address and when the valid read instruction operand is stored in the E-cache unit. The conflict between the read instruction operand address and the write instruction operand address is resolved by the presence of the "busy" signal from the block store cache unit. The "busy" signal maintains the read instruction address in the real address register until the write operation is processed by the E-cache unit and the "busy" signal is removed. Similarly, when the read instruction address operand is not stored in the tag directory unit along with a "valid" signal, the missing operand must be retrieved from the memory unit. This operand retrieval can conflict with the write instruction still pending in the E-cache unit and, therefore, the read instruction operand address is stored in the real address register without further interaction with the E-cache unit until the pending write instruction is completely processed and the "busy" signal is removed from the block store ram. The processing of the pending write instruction includes the storage of the write instruction operand in the cache unit when the "valid" bit is still present after completion of the write instruction operand.

As will be clear to those skilled in the art, the flow diagram of FIG. 5 is meant to illustrate the operation of the present invention and is not meant as representation of actual apparatus. For example, many of the decision steps can be implemented by switches responding to control signals rather than by a logical decision network. Similarly, in FIG. 4, many of the control signal paths that are used to implement a cache unit in the prior art have not been illustrated to emphasize the operation of the present invention.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A data processing system comprising:
  a memory unit;
  a system bus coupled to said memory unit; and
  a plurality of data processing units coupled to said system bus, wherein said data processing units and said memory unit transfer data operands and associated address operands asynchronously over said system bus, each data processing unit processing a sequence of instructions, said sequence of instruction including read instructions and write instructions, each data processing unit transferring a data operand to said main memory in response to a write instruction, each of said data processing units including:
    an address unit responsive to said read and write instructions for providing associated address operands for data operands identified by said read instructions and said write instructions;
    an execution unit responsive to said write instructions for providing data operands for storage in said memory unit at locations identified by associated address operands, wherein determination of a data operand by said execution unit can require a longer time period than providing an associated address operand by said address unit;
    a cache means coupled to said execution unit for storing data operands at locations determined by said associated address operands, said cache means temporarily storing a write instruction address operand from said address unit in response to a first write instruction while said execution unit determines an associated write instruction date operand in response to said first write instruction, said cache means including apparatus providing a read data operand from a location determined by an associated read address operand to said execution unit in response to a read instruction, wherein a read instruction data operand stored in said cache means can be transferred to said execution unit in response to a first read instruction after a write instruction address operand has been transferred to said cache unit and before an associated write instruction data operand has been transferred to said cache means, initiation of processing of said firs read instruction following initiation of processing of said first write instruction by said data processing unit, wherein said cache means apparatus includes busy means for preventing transfer of a read instruction data operand to said execution unit by said cache means until determination of a write instruction data operand when said associated read instruction address operand is identical to said associated write instruction address operand; and
    an interface unit receiving write instruction data operands and associated write instruction address operands from said cache means, said interface unit applying said write data operands and associated write instruction address operands from said cache means to said system bus for transfer to said memory unit.

2. The data processing system of claim 1 wherein said cache means apparatus includes valid means responsive to said read instruction address operand for preventing transfer of said read instruction data operand by said cache means when said cache means does not store a valid operand at a cache means location identified by said associated read instruction address operand.

3. The data processing system of claim 2 wherein said cache means apparatus includes an input address register, said input address register storing said read instruction address operand when said read instruction data operand can not be transferred to said execution unit.

4. The data processing system of claim 1 wherein said cache means apparatus includes register means for storing said write instruction address operand unit receipt of said write instruction data operand.

5. The data processing system of claim 4 further comprising a virtual memory management unit for translating address operands from said address unit to address operands related to storage locations in said cache means and said memory unit.

6. The data processing system of claim 1 wherein said cache means apparatus transfers a second read instruction data operand to said execution unit during determination of said write instruction data operand.

7. A method of expediting instruction execution in a data processing system having at least one pipelined data processing unit and a memory unit asynchronously coupled to a system bus, wherein said data processing units include cache units having a store through strategy, wherein said data processing units execute sequences of instructions including read instructions and write instructions, said method comprising the steps of:
  storing a write address operand determined by a write instruction in a cache unit while an execution unit is determining an associated write data operand;
  transferring a read data operand identified by a read address operand applied to said execution unit as a result of a read instruction processed following said write instruction, said read data operand being transferred to said execution unit after storing said write address operand and before transferring said associated write data operand to said cache unit for transfer to said memory unit;
  comparing said read address operand with said stored write address operand;
  preventing transfer of said read data operand from said cache unit to said execution unit until said write data operand has been transferred to said cache unit;
  transferring a second read data operand to said execution unit in response to a second read instruction following said write instruction prior to transfer of said write data operand to said cache unit; and
  transferring said associated write address operand to said cache unit.

8. The method of expediting instruction execution of claim 7 further comprising the steps of:

determining when a valid read data operand is stored in said cache unit at a location determined by said associated read address operand; and preventing transfer of said read data operand by said cache unit until said write data operand has been transferred to said cache unit when a valid operand is not stored in said cache unit at a location determined by said read address operand.

9. The method of expediting instruction execution of claim 8 further comprising a step of storing read address operand in an input register of said cache unit until said write data operand has been transferred to said cache unit when said read data operand is prevented from being transferred to said 10. The method of expediting instruction execution of claim 7 further comprising a step of preventing transfer of a second write data operand resulting preventing transfer of a second write data operand resulting from a second write instruction following said write instruction to said cache unit prior to transfer of said write data operand to said cache unit.

11. A data processing system having a memory unit and a plurality of data processing units coupled by a system bus, wherein said data processing units are implemented using pipeline techniques, each data processing unit processing sequences of instructions, said sequences of instructions including write instructions and read instructions, each data processing unit including a cache unit, each cache unit comprising:

- a storage unit for storing data operands in a plurality of storage unit locations identified by associated address operands;
- a directory unit having a plurality of locations each related to a one of said storage unit locations, said directory unit locations along with signals stored therein providing an address operand of a data operand stored in said storage unit, said directory unit having at least a valid bit location associated with each of said directory unit locations;
- an input address register for storing an address operand from its data processing unit;
- a write address register for storing a write address operand resulting from a write instruction while a write data operand resulting from said write instruction is being determined; and
- block store means for providing a busy signal when a read address operand resulting from a read instruction following said write instruction is stored in said input address register and said read address operand and a write operand address in said write address register are identical, wherein a read address operand stored in said input address register after storage of a write address operand in said write address register and prior to receipt of said write data operand results in transfer of a read data operand stored at cache unit location determined by said read address operand from said cached unit to said data processing unit when said busy signal is not provided.

12. The data processing system of claim 11 wherein an absence of a valid operand at location determined by said read address operand in said storage nit prevents transfer of said read data operand associated with said read address operand stored in said input register until said write operand has been determined.

13. The data processing system of claim 11 wherein transfer of said read data operand related to said read address operand stored in said input address register from said cache unit to said data processing unit causes a second read address operand to be entered in said input register, said second read address operand resulting from a second read instruction following said read instruction, wherein said second read address operand results in transfer of a second read data operand from a location of said storage unit determined by said second read address operand when said busy signal is not provided.

14. The data processing system of claim 11 wherein said write address register includes a first location indicating when said write address operand is stored along with a valid signal in said directory unit, said write data operand being stored in said storage unit at a location determined by said write address operand when a predetermined signal is present in said write address register first location.

15. The data processing system of claim 11 wherein said data processing unit is comprised of an execution unit, said cache unit being coupled to said execution unit for exchanging data operands therebetween, said execution unit determining said write data operand in response to said write instruction.

16. The data processing system of claim 11 wherein said data processing unit is comprised of a bus interface unit coupled to said system bus for buffering data and address operands transferred between said data processing unit and said system bus, wherein said write address operand and said write data operand are applied to said interface unit in processing a write instruction.

17. The data processing system of claim 11 wherein a second write address operand transferred to said input register prior to a determination of said write data operand is prevented from causing processing by said cache unit until said write data operand is determined.

* * * * *